United States Patent
He et al.

(10) Patent No.: US 7,335,245 B2
(45) Date of Patent: Feb. 26, 2008

(54) METAL AND ALLOY NANOPARTICLES AND SYNTHESIS METHODS THEREOF

(75) Inventors: Ting He, Dublin, OH (US); Chuan-Jian Zhong, Johnson City, NY (US); Jin Luo, Vestal, NY (US); Mathew M. Maye, Vestal, NY (US); Li Han, Binghamton, NY (US); Nancy N. Kariuki, Binghamton, NY (US); Lingyan Wang, Binghamton, NY (US)

(73) Assignees: Honda Motor Co., Ltd., Tokyo (JP); The Research Foundation of the State University of New York, Binghamton, NY (US)

( * ) Notice: Subject to any disclaimer, the term of this patent is extended or adjusted under 35 U.S.C. 154(b) by 580 days.

(21) Appl. No.: 10/944,461

(22) Filed: Sep. 17, 2004

(65) Prior Publication Data

US 2005/0235776 A1 Oct. 27, 2005

Related U.S. Application Data

(63) Continuation-in-part of application No. 10/830,986, filed on Apr. 22, 2004, now Pat. No. 7,053,021.

(51) Int. Cl.
    *B22F 9/24* (2006.01)
(52) U.S. Cl. .................. 75/351; 75/371; 977/896
(58) Field of Classification Search .......... 75/351, 75/371; 977/896
    See application file for complete search history.

(56) References Cited

U.S. PATENT DOCUMENTS

| | | | |
|---|---|---|---|
| 4,714,693 A | 12/1987 | Targos | |
| 5,876,867 A | 3/1999 | Itoh et al. | |
| 6,254,662 B1 | 7/2001 | Murray et al. | |
| 6,262,129 B1 * | 7/2001 | Murray et al. | 516/33 |
| 6,436,167 B1 * | 8/2002 | Chow et al. | 75/371 |
| 6,676,729 B2 * | 1/2004 | Sun | 75/348 |
| 6,929,675 B1 * | 8/2005 | Bunge et al. | 75/362 |
| 6,972,046 B2 | 12/2005 | Sun et al. | |
| 7,053,021 B1 * | 5/2006 | Zhong et al. | 502/185 |
| 7,208,439 B2 * | 4/2007 | Zhong et al. | 502/185 |
| 2001/0009119 A1 | 7/2001 | Murray et al. | |
| 2002/0034675 A1 | 3/2002 | Starz et al. | |
| 2003/0034486 A1 | 2/2003 | Korgel | |

(Continued)

FOREIGN PATENT DOCUMENTS

EP 0 977 212 A2 2/2000

(Continued)

OTHER PUBLICATIONS

Sun, Shouheng; Murray, C.B.; Weller, Dieter; Folks, Liesl; Moser, Andreas; Monodisperse FePt Nanoparticles and Ferromagnetic FePt Nanocrystal Superlattices; Science, Mar. 17, 2000, vol. 287, pp. 1989-1992.

(Continued)

*Primary Examiner*—George Wyszomierski
(74) *Attorney, Agent, or Firm*—Prass & Irving, LLP; Mark E. Duell (57) ABSTRACT

The present teachings are directed toward single metal and alloy nanoparticles and synthesis methods for preparing single metal and alloy nanoparticles.

26 Claims, 5 Drawing Sheets

U.S. PATENT DOCUMENTS

2004/0055419 A1   3/2004   Kurihara et al.
2004/0167257 A1   8/2004   Ryang

FOREIGN PATENT DOCUMENTS

| EP | 1 579 912 A2 | 9/2005 |
|---|---|---|
| WO | WO 03/070371 A2 | 8/2003 |
| WO | WO 2004/045793 A1 | 6/2004 |
| WO | WO 2005/063391 A1 | 7/2005 |

OTHER PUBLICATIONS

Burst, Mathias; Walker, Merryl; Bethell, Donald; Schiffrin, David J.; Whyman, Robin; Synthesis of Thio-derivatised Gold Nanoparticles in a Two-phase Liquid-Liquid System; J. Chem. Soc., Chem. Commun., Apr. 7, 1994, No. 7, pp. 801-802.

Zhong, C. J.; Zhang, W. X.; Leibowitz, F.L.; Eichelberger, H.H.; Size and shape evolution of core-shell nanocrystals; Chem. Commun. 1999, pp. 1211-1212.

Maye, Mathew, M.; Zheng, Wenxia; Leibowitz, Frank L.; Ly, Nam K.; Zhong, Chuan-Jian; Heating-Induced Evolution of Thiolate-Encapsulated Gold Nanoparticles: A Strategy for Size and Shape Manipulations; Langmuir, 2000, vol. 16, No. 2, pp. 490-497.

Maye, Mathew, M.; Zhong, Chuan-Jian; Manipulating core-shell reactivities for processing nanoparticle sizes and shapes; J. Mater. Chem., 2000, vol. 10, pp. 1895-1901.

Zhong, Chuan-Jian; Maye, Mathew, M.; Core-Shell Assembled Nanoparticles as Catalysts; Adv. Mater., 2001, vol. 13, No. 19, pp. 1507-1511.

Bonet, F.; Delmas, V.; Grugeon, S.; Herrera Urbina, R.; Silvert, P-Y.; Tekaia-Elhsissen, K.; Synthesis of Monodisperse Au, Pt, Pd, Ru and Ir Nanoparticles in Ethylene Glycol; NanoStructured Materials, 1999, vol. 11, No. 8, pp. 1277-1284, Elsevier Science Ltd.

Hostetler, Michael, J. et al., "Stable, Monolayer-Protected Metal Alloy Clusters"; J. Am. Chem. Soc., 1998, vol. 120, pp. 9396-9397.

Lou, Jin, et al., "Thermal Activation of Molecularly-Wired Gold Nanoparticles on a Substrate as Catalyst"; J. Am. Chem. Soc., 2002, vol. 124, pp. 13988-13989.

Zhong, et al., Size and Shape Evolutions for Thiolate-Encapsulated Gold Nanocrystals; Chem. Commun. 1999, pp. 1211.

* cited by examiner

METAL AND ALLOY NANOPARTICLES AND SYNTHESIS METHODS THEREOF

CROSS-REFERENCE TO RELATED APPLICATIONS

The present application is a continuation-in-part application of and claims benefit from earlier filed U.S. patent application Ser. No. 10/830,986, filed Apr. 22, 2004 now U.S. Pat. No. 7,053,021, which is incorporated herein in its entirety by reference for all purposes.

BACKGROUND

1. Field of the Invention

The present teachings relate to metal and alloy nanoparticles and methods to synthesize the nanoparticles.

2. Discussion of the Related Art

The desire to reduce the amount of expensive platinum group metals (hereinafter "PGM") needed to obtain a required level of performance for various catalyst-based reactions is an ever present operational parameter for the design of many chemical reactions.

Enhancement of catalyst performance by alloying with various less expensive metals, by stabilizing preferred catalyst oxidation states, by minimizing deleterious interactions with support materials are some of the possible avenues to either reduce the amount of catalyst required or increase the efficiency of the chemical reaction, or both.

Use of metal-containing nanoparticles that can increase the utilization of catalyst and reduce the amount of catalyst required is also one of the possible approaches to achieve the same catalyst performance with a reduce amount of the metal component. Difficulty in controlling the particle size, distribution and uniformity of composition of the metal-containing nanoparticles are concerns with metal-containing nanoparticle preparation schemes.

A need exists, therefore, for synthesis methods to produce metal-containing nanoparticles with the desired dispersion, composition and distribution characteristics of the metal catalyst.

SUMMARY

The present teachings satisfy the need for synthesis methods for metal-containing nanoparticles.

The present teachings include a method of preparing metal nanoparticles which method includes contacting a metal-containing component with a reducing agent, optionally with a capping agent, in a solvent system to form a reaction mixture. The reaction mixture can be heated to reflux, cooled, and the desired metal nanoparticles can be precipitated from the reaction mixture. Optionally, the metal nanoparticles can be supported on a suitable support material, such as, a high surface area support material. The support material can be incorporated into the reaction mixture, for instance, along with the reducing agent.

The present teachings include a method of preparing alloy nanoparticles which method includes contacting at least two metal-containing components with a reducing agent and at least one capping agent in a solvent system to form a reaction mixture, heating and refluxing the reaction mixture, cooling the reaction mixture, and precipitating the alloy nanoparticles from the cooled reaction mixture.

The methods of the present teachings also include a method of preparing alloy nanoparticles including contacting at least one first metal-containing component with a reducing agent to form a first reaction mixture. The first reaction mixture is then heated to a first temperature and then at least one second metal-containing component and at least one capping agent are incorporated into the first reaction mixture to form a second reaction mixture. This second reaction mixture is heated to a second temperature, refluxed, cooled, and alloy nanoparticles are precipitated from the cooled second reaction mixture.

The present teachings further include a method of preparing alloy nanoparticles. This method includes contacting at least a first metal-containing component and a second metal-containing component with a reducing agent in a solvent system to form a first reaction mixture, and heating the first reaction mixture to a first temperature. A third metal-containing component and at least one capping agent are incorporated into the first reaction mixture at the first temperature to form a second reaction mixture. The second reaction mixture is heated to a second temperature, refluxed, cooled, and alloy nanoparticles are precipitated from the cooled reaction mixture.

The present teachings include a method of preparing supported alloy nanoparticles. This method includes contacting at least two metal-containing components with a reducing agent in a solvent system to form a reaction mixture. The reaction mixture can also include a support material.

The present teachings include metal and alloy-containing nanoparticles narrowly distributed and dispersed substantially evenly throughout a volume of the nanoparticles, and wherein the particle size and composition are controllable over the range of interest. For example, over about 95% of the nanoparticles have a particle size of between about 1 nm and about 4 nm, with an average size of 2 nn, is provided. Also, the atomic composition of each metal varies within about 15 percent from one alloy nanoparticle to another, and the average atomic composition of metals in the alloy nanoparticles varies within about 5 percent of targeted compositions.

BRIEF DESCRIPTION OF THE FIGURES

The accompanying figures, which are included to provide a further understanding of the present teachings and are incorporated in and constitute a part of this specification, illustrate various embodiments of the present teachings and together with the detailed description serve to explain the principles of the present teachings. In the figures.

DETAILED DESCRIPTION

The present teachings relate to methods of preparing alloy nanoparticles including contacting at least two metal-containing components with a reducing agent and at least one capping agent in a solvent system to form a reaction mixture which is then heated, refluxed, cooled, and then the alloy nanoparticles are precipitated from the cooled reaction mixture.

According to various embodiments of the present teachings, the heating step can occur in two or more stages. The first stage heating can be to a temperature sufficient to remove, for example, any water from the reaction mixture, while the second stage heating can be to reflux conditions to reduce the metal-containing component.

According to various embodiments of the present teachings, the method can further include contacting the alloy nanoparticles with a support material to form supported alloy nanoparticles. The support material can be a high surface area support material including support material with a surface area of at least about 200 $m^2/g$, of at least about 800 $m^2/g$, and of at least about 1000 $m^2/g$. The support material can include one or more of carbon or inorganic materials. According to various embodiments of the present teachings, the support material can be carbon black, carbon fiber, or carbon nanotube. According to various embodiments of the present teachings, a support material can be incorporated with the solvent system prior to the metal contacting step.

According to various embodiments of the present teachings, the method can further include one or more of the following heat treatments of the alloy nanoparticles:

heating the alloy nanoparticles to a sufficient temperature to remove solvent and form solvent-free alloy nanoparticles, heating the solvent-free alloy nanoparticles to a sufficient temperature in a sufficiently oxidizing environment to oxidize any capping agents and form decapped alloy nanoparticles, and heating the decapped alloy nanoparticles to a sufficient temperature in a sufficiently reducing environment to reduce the metals of the decapped alloy nanoparticles. According to various embodiments of the present teachings, the heat treatment can include any combination of three above-described treatment steps. The combination of treatment steps can depend upon the formulation of the alloy nanoparticles, for example, the presence and formulation of a support material, the presence and formulation of a capping agent, the metal-containing component and solvent system used in forming the alloy nanoparticles.

According to various embodiments of the present teachings, the heating regime to evaporate and remove solvent can include heating to between about 100° C. and about 400° C. in an inert environment, for example, nitrogen. According to various embodiments of the present teachings, the heating regime to oxidize and remove the organic shells formed by any capping agents can include heating to between about 200° C. and about 300° C. in an oxidizing environment, for example, air or another oxygen-containing environment, for example, 15% oxygen/85% nitrogen gas mixture. According to various embodiments of the present teachings, the heating regime to reduce the metal of the alloy nanoparticles and activate the alloy can include an optional pre-reduction step of heating to between about 300° C. and 400° C. in a reducing atmosphere that can be followed by a reduction and alloying treatment by heating to between about 350° C. and about 700° C. in a reducing atmosphere. The reducing atmosphere can include hydrogen or carbon monoxide, for example, a gas mixture of 7% hydrogen/93% nitrogen.

According to various embodiments of the present teachings, the metal-containing component can include a metal-containing complex having one or more non-metallic moieties selected from the group consisting of, for example, hydroxyls, amines, carbonyls, nitrates, oxides, acetylacetonates, halides, chlorides, alkyl-containing moieties, alkoxy-containing moieties, aryl-containing moieties, nitrosyl-containing moieties, and combinations thereof.

According to various embodiments of the present teachings, the metal-containing component can include a metal-containing complex containing at least one metal selected from the group consisting of, for example, titanium, zirconium, vanadium, tantalum, chromium, molybdenum, tungsten, manganese, rhenium, iron, ruthenium, osmium, cobalt, rhodium, iridium, nickel, palladium, platinum, copper, tin, and selenium.

According to various embodiments of the present teachings, the contacting step of the method can occur in a solvent system, for example, a high-temperature solvent system, such as a solvent system that decomposes at a temperature greater than about 300° C. The high-temperature solvent system can include, for example, one or more component selected from the group consisting of octyl ether, benzyl ether, toluene, tetrahydrofuran, hexane, propanol, water, 1-butanol, diphenylmethane, phenyl ether, ethanol, ethylenediamine, and combinations thereof.

According to various embodiments of the present teachings, the reducing agent can include one or more of sodium borohydride, 1,2-hexadecanediol, trimethylaluminum, formic acid, ammonium hydroxide, hydrazine monohydrate, and combinations thereof.

According to various embodiments of the present teachings, the reducing agent can include, for example, a reducing process. The reducing process can be selected from sonolysis, boil liquid reduction, reverse micelle, and combinations thereof.

According to various embodiments of the present teachings, the capping agent can include one or more capping agent selected from a thiol, a polyacrylic acid, oleyl amine, oleic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

The present teachings utilize a variety of capping agents to cap nanoparticles formed with a metal core containing the desired metal components, either of the same metal or different metals, and an outer organic shell formed from the long organic feature of the capping agent. The functionalized end of the capping agent reacts with the metals by, for example, attaching to the metals via a carboxylic acid moiety or an ammonium-containing moiety. This capping agent is then removed by decomposition by, for example, heating in an oxygen-containing environment.

According to various embodiments of the present teachings, a method of preparing alloy nanoparticles is provided that can include contacting at least one first metal-containing component with a reducing agent to form a first reaction mixture, and then heating the first reaction mixture to a first temperature. At the first temperature, at least one second metal-containing component and at least one capping agent can be incorporated into the first reaction mixture to form a second reaction mixture, that can then be heated to a second temperature. According to various embodiments of the present teachings, the second temperature can be higher than the first temperature, for example, to reflux conditions. The second reaction mixture can then be refluxed and allowed to cool down. The desired alloy nanoparticles can be precipitated from the cooled second reaction mixture.

According to various embodiments of the present teachings, the first temperature to which the reaction mixture is heated can be sufficient to remove any water present in the reaction mixture, for example, when organic solvent is used. Thus, a first temperature greater than about 100° C., or about 105° C. to about 115° C. is typically sufficient to remove water from the reaction mixture. According to various embodiments of the present teachings, the second temperature to which the reaction mixture is heated can be sufficient to drive the decomposition or reduction reaction substantially to completion. Accordingly, second temperatures in a range of between about 120° C. to about 300° C., or in a range of about 140° C. to about 280° C., or in a range of about 150° C. to about 270° C. can be utilized.

According to various embodiments of the present teachings, the method can include contacting the alloy nanoparticles with a support material to form a supported alloy nanoparticles. The support material can be a high surface area support material, including support material with surface areas of at least about 200 $m^2/g$, of at least about 800 $m^2/g$, and of at least about 1000 $m^2/g$. The support material can include one or more of carbon or inorganic materials. According to various embodiments of the present teachings, the support material can be carbon black, carbon fiber, or carbon nanotube. According to various embodiments of the present teachings, a support material can be incorporated with the solvent system prior to the contacting step.

According to various embodiments of the present teachings, the method can include one or more of the following heat treatment steps, for example, heating the alloy nanoparticles to a sufficient temperature to remove solvent and form a solvent-free alloy nanoparticles, heating the solvent-free alloy nanoparticles to a sufficient temperature in a sufficiently oxidizing environment to oxidize any capping agents and form decapped alloy nanoparticles, and heating the decapped alloy nanoparticles to a sufficient temperature in a sufficiently reducing environment to reduce the decapped alloy nanoparticles.

According to various embodiments of the present teachings, the metal-containing component utilized in the method can include a metal-containing complex having one or more non-metallic moieties selected from the group consisting of hydroxyls, amines, carbonyls, nitrates, oxides, acetylacetonates, halides, chlorides, alkyl-containing moieties, alkoxy-containing moieties, aryl-containing moieties, nitrosyl-containing moieties, and combinations thereof.

According to various embodiments of the present teachings, the metal-containing component utilized in the method can include a metal-containing complex containing at least one metal selected from the group consisting of titanium, zirconium, vanadium, tantalum, chromium, molybdenum, tungsten, manganese, rhenium, iron, ruthenium, osmium, cobalt, rhodium, iridium, nickel, palladium, platinum, copper, tin, and selenium.

According to various embodiments of the present teachings, the contacting step of the method occurs in a solvent system that comprises a high-temperature solvent system. The high-temperature solvent system can include a solvent system that decomposes at a temperature greater than about 300° C. The high-temperature solvent system can include, for example, one or more component selected from the group consisting of octyl ether, benzyl ether, toluene, tetrahydrofuran, hexane, propanol, water, 1-butanol, diphenylmethane, phenyl ether, ethanol, ethylenediamine, and combinations thereof.

According to various embodiments of the present teachings, the reducing agent utilized in the method can include one or more reducing agent selected from the group consisting of sodium borohydride, 1,2-hexadecanediol, trimethylaluminum, formic acid, ammonium hydroxide, hydrazine monohydrate, and combinations thereof.

According to various embodiments of the present teachings, the reducing agent can include, not only a chemical reactant, but also a reducing process that can include one or more of sonolysis, boil liquid reduction, reverse micelle, and combinations thereof.

According to various embodiments of the present teachings, the capping agent can include one or more component selected from the group consisting of a thiol, a polyacrylic acid, oleyl amine, oleic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

The method provided by the present teachings can include a method of preparing alloy nanoparticles including contacting at least a first metal-containing component and a second metal-containing component with a reducing agent in a solvent system to form a first reaction mixture. The first reaction mixture can then be heated to a first temperature. According to various embodiments of the present teachings, a third metal-containing component and at least one capping agent can be incorporated into the first reaction mixture at the first temperature to form a second reaction mixture. The second reaction mixture can be heated to a second temperature. According to various embodiments of the present teachings, the second temperature can be higher than the first temperature. The second reaction mixture can then be refluxed and cooled, and alloy nanoparticles can be precipitated from the cooled reaction mixture.

According to various embodiments of the present teachings, the alloy nanoparticles can be contacted with a support material to form supported alloy nanoparticles. The support material can include one or more of carbon or inorganic materials, especially carbon black, carbon fiber, or carbon nanotube.

According to various embodiments of the present teachings, the method provided can further comprising one or more of the following:

heating the alloy nanoparticles to a sufficient temperature to remove solvent and form solvent-free alloy nanoparticles;

heating the solvent-free alloy nanoparticles to a sufficient temperature in a sufficiently oxidizing environment to oxidize any capping agents and form decapped alloy nanoparticles; and heating the decapped alloy nanoparticles to a sufficient temperature in a sufficiently reducing environment to reduce the metals of the decapped alloy nanoparticles.

According to various embodiments of the present teachings, the heating regime to evaporate and remove solvent can include heating to between about 100° C. and about 400° C. in an inert environment, for example, nitrogen. According to various embodiments of the present teachings, the heating regime to oxidize and remove the organic shell formed by any capping agents can include heating to between about 200° C. and about 300° C. in an oxidizing environment, for example, air or another oxygen-containing environment, for example, 15% oxygen/85% nitrogen gas mixture. According to various embodiments of the present teachings, the heating regime to reduce and activate the metal of the metallic nanoparticles can include an optional pre-reduction step of heating to between about 300° C. and 400° C. in a reducing atmosphere that can be followed and alloying treatment by heating to between about 350° C. and about 700° C. in a reducing atmosphere. The reducing atmosphere can include hydrogen or carbon monoxide, for example, a gas mixture of 7% hydrogen/93% nitrogen.

According to various embodiments of the present teachings, the metal-containing component can include a metal-containing complex having one or more non-metallic moieties selected from the group consisting of hydroxyls, amines, carbonyls, nitrates, oxides, acetylacetonates, halides, chlorides, alkyl-containing moieties, alkoxy-containing moieties, aryl-containing moieties, nitrosyl-containing moieties, and combinations thereof.

According to various embodiments of the present teachings, the metal-containing component can include a metal-containing complex containing at least one metal selected from the group consisting of titanium, zirconium, vanadium, tantalum, chromium, molybdenum, tungsten, manganese, rhenium, iron, ruthenium, osmium, cobalt, rhodium, iridium, nickel, palladium, platinum, copper, tin, and selenium.

According to various embodiments of the present teachings, the method can utilize a solvent system that can include a high-temperature solvent system, specifically, a high-temperature solvent system that can include a solvent system that decomposes at a temperature greater than about 300° C. The high-temperature solvent system can include one or more component selected from the group consisting of octyl ether, benzyl ether, toluene, tetrahydrofuran, hexane, propanol, water, 1-butanol, diphenylmethane, phenyl ether, ethanol, ethylenediamine, and combinations thereof.

According to various embodiments of the present teachings, the reducing agent utilized can include one or more reducing agent selected from the group consisting of sodium borohydride, 1,2-hexadecanediol, trimethylaluminum, formic acid, ammonium hydroxide, hydrazine monohydrate, and combinations thereof. The reducing agent can also include reducing processes, such as, for example, a process selected from sonolysis, boil liquid reduction, reverse micelle, and combinations thereof.

According to various embodiments of the present teachings, the capping agent can include one or more component selected from the group consisting of a thiol a polyacrylic acid, oleyl amine, oleic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

According to the present teachings, nanoparticles containing only one metal can also be synthesized using the methods set forth herein. The metallic nanoparticles prepared according to the present teachings can be supported on various high surface area support materials and can provide enhanced performance as catalysts or electrocatalysts.

A method provided by the present teachings can include a method of preparing single metal nanoparticles including contacting a metal-containing component with a reducing agent, optionally a capping agent, and optionally a support material in a solvent system to form a reaction mixture. The reaction mixture can then be heated, for example, by a two step heating process, to remove any water present in the system, and to drive the reaction to substantial completion.

According to various embodiments of the present teachings, the metal nanoparticles can be contacted with a support material to form supported metal nanoparticles. The support material can include one or more of carbon or inorganic materials, especially carbon black, carbon fiber, or carbon nanotube.

According to various embodiments of the present teachings, the method provided can further comprising one or more of the following:

heating the metal nanoparticles to a sufficient temperature to remove solvent and form solvent-free metal nanoparticles;

heating the solvent-free metal nanoparticles to a sufficient temperature in a sufficiently oxidizing environment to oxidize any capping agents and form decapped metal nanoparticles; and heating the decapped metal nanoparticles to a sufficient temperature in a sufficiently reducing environment to reduce the metal of the decapped metal nanoparticles.

According to various embodiments of the present teachings, the heating regime to evaporate and remove solvent can include heating to between about 100° C. and about 400° C. in an inert environment, for example, nitrogen. According to various embodiments of the present teachings, the heating regime to oxidize and remove the organic shell formed by any capping agents can include heating to between about 200° C. and about 300° C. in an oxidizing environment, for example, air or another oxygen-containing environment, for example, 15% oxygen/85% nitrogen gas mixture. According to various embodiments of the present teachings, the heating regime to reduce and activate the metal of the metallic nanoparticles can include an optional pre-reduction step of heating to between about 300° C. and 400° C. in a reducing atmosphere that can be followed and further treatment by heating to between about 350° C. and about 700° C. in a reducing atmosphere. The reducing atmosphere can include hydrogen or carbon monoxide, for example, a gas mixture of 7% hydrogen/93% nitrogen.

According to various embodiments of the present teachings, the metal-containing component can include a metal-containing complex having one or more non-metallic moieties selected from the group consisting of hydroxyls, amines, carbonyls, nitrates, oxides, acetylacetonates, halides, chlorides, alkyl-containing moieties, alkoxy-containing moieties, aryl-containing moieties, nitrosyl-containing moieties, and combinations thereof.

According to various embodiments of the present teachings, the metal-containing component can include a metal-containing complex containing at least one metal selected from the group consisting of titanium, zirconium, vanadium, tantalum, chromium, molybdenum, tungsten, manganese, rhenium, iron, ruthenium, osmium, cobalt, rhodium, iridium, nickel, palladium, platinum, copper, tin, and selenium.

According to various embodiments of the present teachings, the method can utilize a solvent system that can include a high-temperature solvent system, specifically, a high-temperature solvent system that can include a solvent system that decomposes at a temperature greater than about 300° C. The high-temperature solvent system can include one or more component selected from the group consisting of octyl ether, benzyl ether, toluene, tetrahydrofuran, hexane, propanol, water, 1-butanol, diphenylmethane, phenyl ether, ethanol, ethylenediamine, and combinations thereof.

According to various embodiments of the present teachings, the reducing agent utilized can include one or more reducing agent selected from the group consisting of sodium borohydride, 1,2-hexadecanediol, trimethylaluminum, formic acid, ammonium hydroxide, hydrazine monohydrate, and combinations thereof. The reducing agent can also include reducing processes, such as, for example, a process selected from sonolysis, boil liquid reduction, reverse micelle, and combinations thereof.

According to various embodiments of the present teachings, the capping agent can include one or more component selected from the group consisting of a thiol, a polyacrylic acid, oleyl amine, oleic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

The present teachings also provide for alloy nanoparticles that can include a nanoparticle having two or more metals distributed and dispersed substantially evenly throughout a volume of the nanoparticle, with the particle size controllable, for example having over about 95% of the nanoparticles with a particle size of between about 1 nm and about 4 nm, with an average particle size of about 2 nm.

According to various embodiments of the present teachings, the alloy nanoparticles can have a mole percent variation in the composition of a single metal present in the alloy nanoparticle that can vary no more than about 15 mole percent from one nanoparticle to another nanoparticle. Additionally, the alloy nanoparticles can have a narrow particle size distribution, for example, over about 70% of the nanoparticles have a particle size of between about 1.5 nm and about 2.5 nm, or where over about 60% of the nanoparticles have a particle size between about 1.7 nm and about 2.4 nm.

According to various embodiments of the present teachings, the particle size of the metallic nanoparticles can be controlled by a combination of a variety of factors including the concentration of the reactants, the temperature of the second stage or reflux stage of the preparation process, the metal-containing component, and the heat treatment of the metal-containing nanoparticle. According to various embodiments of the present teachings, these same factors can also control the composition of alloy nanoparticles.

Control of the particle size and distribution of the metallic nanoparticles is illustrated in FIGS. 1A through 1D. FIG. 1A and FIG. 1C are images produced by a transmission electron microscopy of core-shell structured PtVFe and PtNiFe nanoparticles produced by methods according to the present teachings. Core-shell refers to the presence of an organic shell formed by any capping agents around a metal-containing core. The average particle size of the nanoparticles is about 1.9 nm with a very narrow particle size distribution.

FIGS. 2A through 2D are TEM images of carbon supported Pt, PtFe, PtVFe and PtNiFe nanoparticles after activation, according to the present teachings. The images show very uniform particle size with a very narrow particle size distribution.

Figure 3:
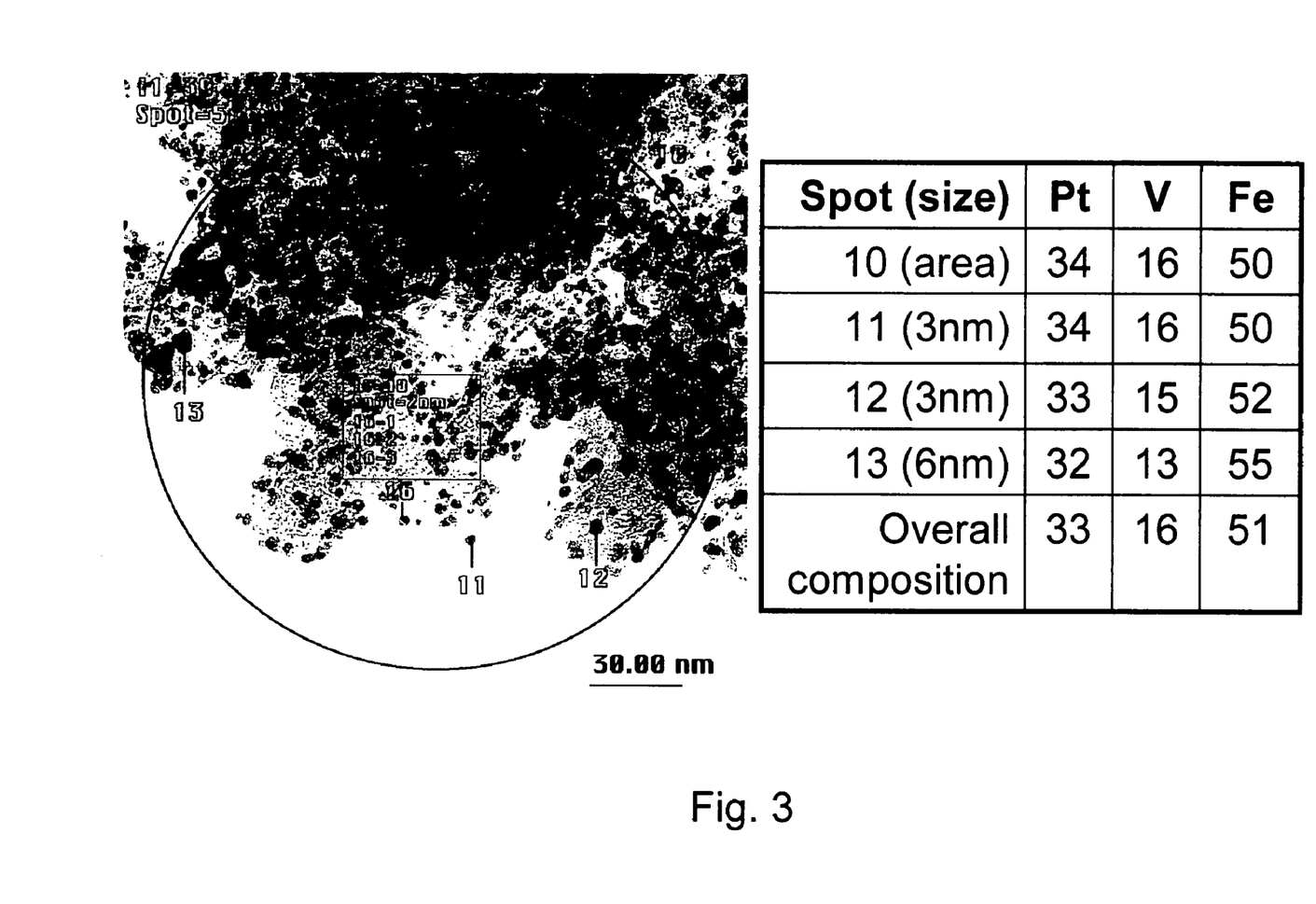
FIG. 3 is a TEM image with an energy dispersed x-ray spectroscopy (hereinafter "EDX") composition analysis of platinum, vanadium, and iron-containing individual nanoparticles made according to the present teachings.

Control of the composition of the nanoparticles is illustrated in FIG. 3. This is a TEM image together with energy dispersed X-ray spectroscopy (EDX) composition analysis of platinum, vanadium and iron-containing individual nanoparticles made according to the present teachings. The accompanying table presents the compositional make-up of various spots highlighted in the image. The average atomic compositional variation between the highlighted spots can be less than about 15 percent. The nanoparticles of FIG. 3 were prepared as set forth in Example 11 below.

The support or carrier material may be any high surface area support or carrier used with the nanoparticle which provides a stable surface for supporting the nanoparticles. The support material can be a high surface area support material, including support material with surface areas of at least about 200 $m^2/g$, of at least about 800 $m^2/g$, and of at least about 1000 $m^2/g$.

According to various embodiments of the present teachings, the support material may be relatively inert to the conditions utilized in the desired catalytic process, and may include other carrier materials or catalyst modifiers that have traditionally be utilized in catalytic processes, such as, (1) activated carbon, carbon fiber, carbon nanotube, graphite, coke, or charcoal; (2) silica or silica gel, silicon carbide, clays, and silicates including those synthetically prepared and naturally occurring, for example, china clay, diatomaceous earth, fuller's earth, kaolin, etc.; (3) ceramics, porcelain, bauxite; (4) refractory inorganic oxides such as alumina, titanium dioxide, zirconium oxide, magnesia, etc.; (5) crystalline and amorphous aluminosilicates such as naturally occurring or synthetically prepared mordenite and/or faujasite; and, (6) combinations of these groups.

According to various embodiments of the present teachings, high surface area conductive carbon, such as carbon black, carbon fiber, and carbon nanotube are preferred carriers when these nanoparticles are used as electrocatalysts. According to various embodiments of the present teachings, high surface area aluminas, such as gamma-, delta- or theta-alumina are preferred alumina carriers when the nanoparticles are used as heterogeneous catalysts. Other alumina carriers, such as mixed silica alumina, sol-gel alumina, as well as sol-gel or co-precipitated alumina-zirconia carriers can be used. Alumina typically has a higher surface area and a higher pore volume than carriers such as zirconia and offers a price advantage over other more expensive carriers.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the present teachings are exemplary and should not be construed as limiting the scope of the present teachings.

EXAMPLES

Hydrodynamic Rotating Disc Electrode Measurements

The intrinsic kinetic properties for oxygen reduction reaction of these nanoparticles were electrochemically screened using a hydrodynamic rotating disc electrode (RDE) apparatus. A suitable apparatus is available commercially, for example, from Pine Instruments (Grove City, Pa.) or Princeton Applied Research (Oak Ridge, Tenn.). An ink composed of 20 mg sample in 20 mL 18.2 MΩ water, and 1 mL 5% Nafion solution was mixed using an ultrasonic probe. An aliquot of 15 μL of the ink was uniformly spotted on a 5 mm diameter glassy carbon electrode and allowed to dry in air. A high purity 0.5 M $H_2SO_4$ solution was used as medium for the electrode reaction.

The sample is cleaned electrochemically to remove contamination. Cleaning is accomplished by purging the sulfuric acid solution with 5 N Ar for 30 minutes. The coated glassy carbon electrode was placed in the solution, and cleaned by cyclic voltammetric method (for example, 0 to 1 V, 200 mV/sec, 100 cycles) without rotation.

Following cleaning, a slow cyclic voltammetric scan is recorded (0 to 1 V, 50 mV/sec, 1 cycle), and the electrochemical surface area of platinum-based nanoparticles was calculated through the hydrogen UPD. Then, the disc electrode was removed, and the solution was purged with oxygen for 30 minutes to saturate the solution with oxygen. The rotating disc electrode was place back into the solution, rotated at 200 to 3000 rpm, and a hydrodynamic anodic scan performed (0 to 1 V, 5 mV/sec). Several electrochemical parameters can be calculated based on the anodic scan to reflect the intrinsic kinetic properties for oxygen reduction reaction, such as, the potential at half current maximum, E(½), and Tafel plots, so that the kinetic current or mass-based kinetic current can be determined and compared with each other.

Electron Microscopic Images

Figure 1:
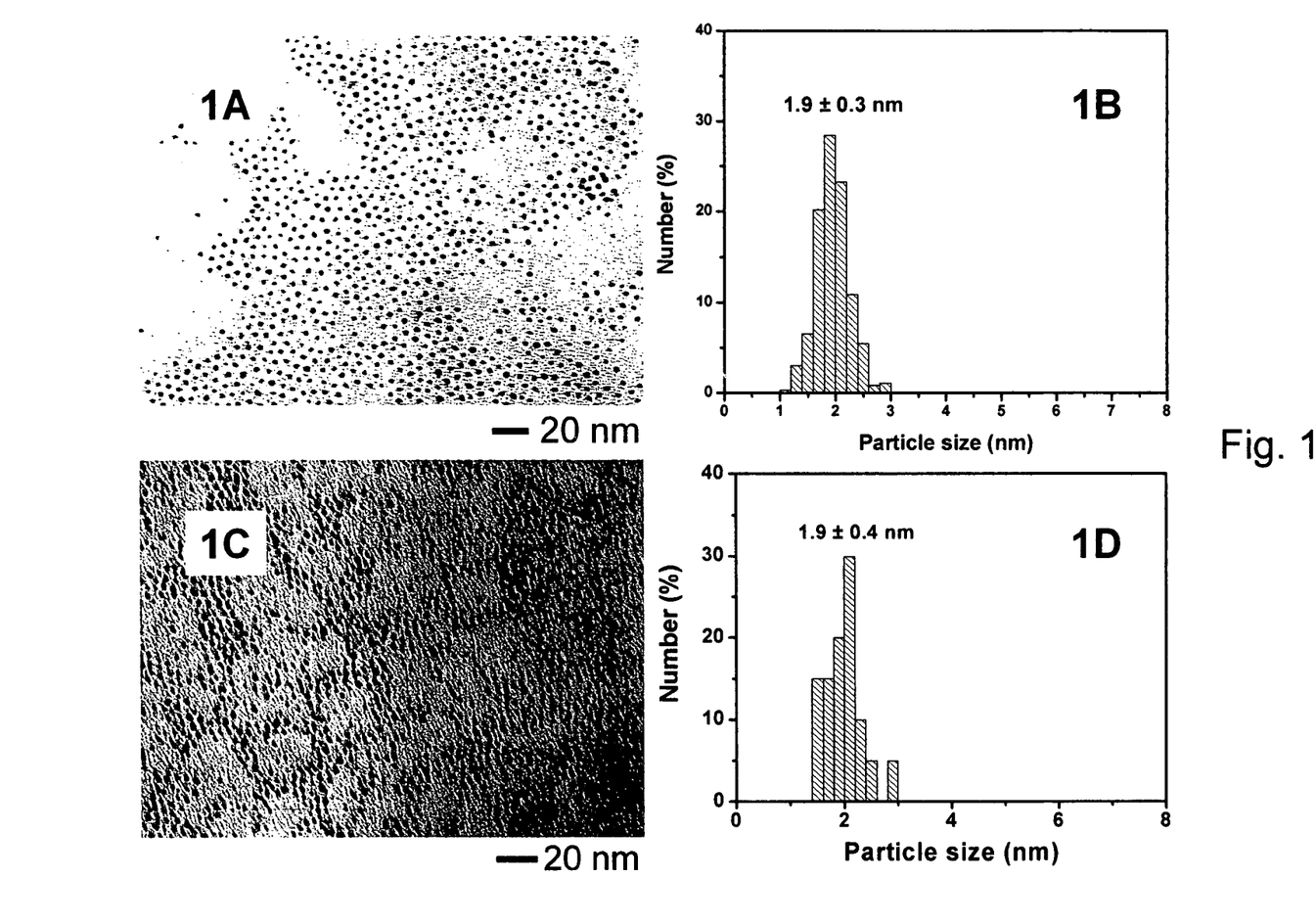
FIGS. 1A and 1C are transmission electron microscopy (hereinafter "TEM") images of PtVFe and PtNiFe nanoparticles made according to the present teachings.
FIGS. 1B and 1D are the respective particle size distributions.
Figure 2:
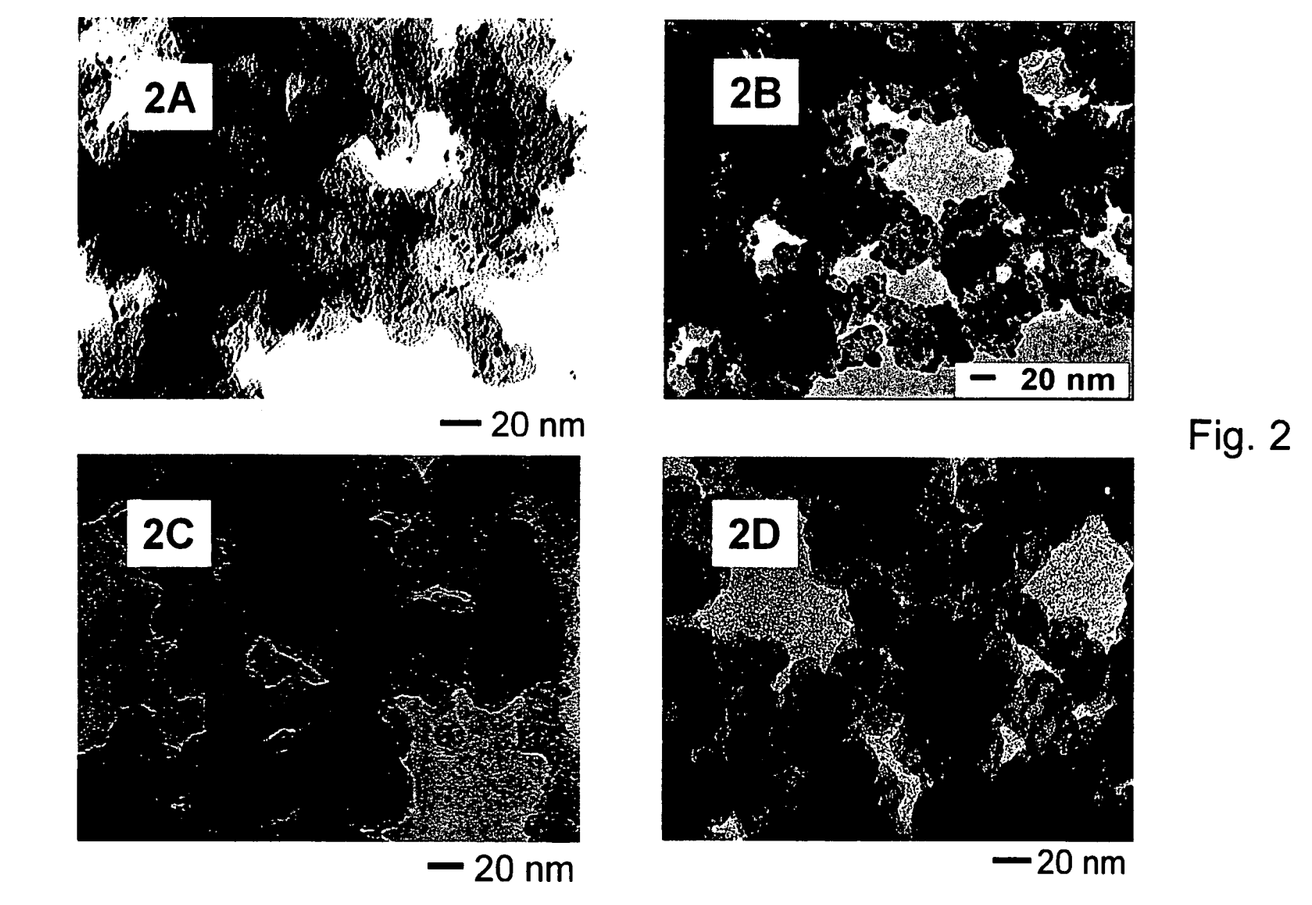
FIGS. 2A through 2D are TEM images of carbon supported Pt, PtFe, PtVFe and PtNiFe nanoparticle electrocatalysts made according to the present teachings, respectively.

Transmission electron microscopy images, as presented in FIGS. 1 through 3, were obtained on commercially available TEM instruments, such as those available from Hitachi (Tokyo, Japan) and JEOL (Tokyo, Japan). The composition analysis presented in FIG. 3 was performed by energy dispersed X-ray spectroscopy (EDX) attached to the TEM.

Example 1

A three-neck 250 mL flask is charged with 50 mL octyl ether, 0.25 g HDD (1,2-hexadecanediol), 0.20 g $Pt(acac)_2$, 1.0 mL OAM (oleyl amine) and 0.3 mL OAC (oleic acid). During the synthesis process, the mixture is under constant stirring. The mixture is purged with nitrogen while heating to 105° C. to remove residual water. The mixture is then heated to 230° C., and refluxed for 20 minutes.

The mixture is then allowed to cool to room temperature, and the contents transferred to a larger flask under ambient environment. Ethanol (100 mL) is added to precipitate the reaction product. The reaction product is then dispersed in 30 mL hexane.

Example 2

High surface area carbon black, 140 mg, (Ketjen Black ECP, Lion Corporation, Tokyo, Japan) is suspended in 350 mL hexane, and sonicated for three hours at ambient temperature. The black reaction product (69.5 mg in 25 mL solution) from Example 1 above is added to the carbon black/hexane suspension, and the mixture is sonicated for 30 minutes, followed by stirring for 15 hours. The solvent is removed by purging nitrogen for four to eight hours and the remaining solid is collected and dried under nitrogen.

The collected solid can then be heated under nitrogen to 400° C. for two hours. The organic shell components can be removed by heating to 280° C. under a 20/80 oxygen/nitrogen mixture for 30 minutes. The solid is then heated to 300° C. under a flow of nitrogen for an hour to removal residual oxygen. The temperature is raised to 400° C. and the solid exposed to a flowing 15/85 hydrogen/nitrogen for 60 minutes. The solid is then cooled to room temperature.

Example 3

A three-neck 250 mL flask is charged with 120 mL octyl ether, 1.953 g HDD, and 1.014 g $Pt(acac)_2$, under stirring. The mixture is purged with nitrogen while heating to 105° C. to remove residual water. To this mixture is added 1.2 mL OAM, 1.0 mL OAC and 0.68 mL $Fe(CO)_5$, the mixture is then heated to reflux for 40 minutes at 275° C.

The mixture is then allowed to cool to room temperature, and the contents transferred to a larger flask under ambient environment. Ethanol (300 mL) is added to precipitate a black product. The black product is then dispersed in 150 mL hexane in the presence of 0.6 mL OAM and 0.5 mL OAC, and then precipitated out by adding 300 mL ethanol. The resulting solid has a Pt:Fe ratio of 48:52.

Example 4

High surface area carbon black, 240 mg, (Ketjen Black ECP) is suspended in 440 mL hexane, and sonicated for 20 hours at ambient temperature. The black product (160 mg in 35 mL solution) from Example 3 above is added to the carbon black/hexane suspension, and the mixture is sonicated for 10 hours at less than room temperature but above 0° C., followed by stirring for 20 hours. The suspension is kept at less than room temperature for about 24 hours, and then the precipitated powder is collected and dried under nitrogen.

The collected solid can then be heated to remove organic shell components by heating to 300° C. under a 15/85 oxygen/nitrogen gas mixture for 30 minutes. The temperature is raised to 450° C. and the solid exposed to a 7/93 hydrogen/nitrogen gas mixture for 2 hours. The solid is then cooled to room temperature.

Example 5

A three-neck 250 mL flask is charged with 60 mL octyl ether, 0.50 g HDD, 0.40 g $Pt(acac)_2$, and 0.15 g $VO(acac)_2$, under constant stirring. The mixture is placed under a nitrogen atmosphere and heated to 105° C. to remove residual water. To this mixture is added 0.3 mL OAM, 0.3 mL OAC and 0.3 mL $Fe(CO)_5$, the mixture is then heated to reflux for 40 minutes at 270° C.

The mixture is then allowed to cool to room temperature, and the contents transferred to a larger flask under ambient environment. Ethanol (200 mL) is added to precipitate a black product. The black product is then dispersed in 100 mL hexane in the presence of 0.15 mL OAM and 0.15 mL OAC, and then precipitated out by adding 200 mL ethanol. The resulting solid has a Pt:V:Fe ratio of 32:14:54.

Example 6

A three-neck 250 mL flask is charged with 60 mL octyl ether, 0.50 g HDD, 0.40 g $Pt(acac)_2$, and 0.20 g $V(acac)_3$, and the mixture is constantly stirred. The mixture is placed under a nitrogen atmosphere and heated to 105° C. to remove residual water. To this mixture is added 0.3 mL OAM, 0.3 mL OAC and 0.3 mL $Fe(CO)_5$, the mixture is then heated to reflux for 40 minutes at 270° C.

The mixture is then allowed to cool to room temperature, and the contents transferred to a larger flask under ambient environment. Ethanol (200 mL) is added to precipitate a black product. The black product is then dispersed in 100 mL hexane in the presence of 0.15 mL OAM and 0.15 mL OAC, and then precipitated out by adding 200 mL ethanol. The resulting solid has a Pt:V:Fe ratio of 33:12:55.

Example 7

A three-neck 250 mL flask is charged with 30 mL octyl ether, 0.90 g HDD, 0.20 g Pt(acac)$_2$, 0.075 g VO(acac)$_2$, 0.29 g Fe(acac)$_2$, 0.2 mL OAM, and 0.2 mL OAC, and the mixture is under constant stirring. The mixture is placed under a nitrogen atmosphere and heated to 105° C. to remove residual water. The mixture is then heated to reflux for 40 minutes at 270° C.

The mixture is then allowed to cool to room temperature, and the contents transferred to a larger flask under ambient environment. Ethanol (200 mL) is added to precipitate a black product. The black product is then dispersed in 100 mL hexane in the presence of 0.15 mL OAM and 0.15 mL OAC, and then precipitated out by adding 200 mL ethanol. The resulting solid has a Pt:V:Fe ratio of 27:11:62.

Example 8

A three-neck 250 mL flask is charged with 120 mL octyl ether and 180 g carbon black (Ketjen Black ECP), and the mixture is sonicated for four hours. Then, 1.0 g HDD, 0.413 g Pt(acac)$_2$, and 0.274 g VO(acac)$_2$, and the mixture is under constant stirring. The mixture is placed under a nitrogen atmosphere and heated to 105° C. to remove residual water. To this mixture is added 0.2 mL OAM, 0.2 mL OAC and 0.15 mL Fe(CO)$_5$, the mixture is then heated to reflux for 40 minutes at 270° C.

The mixture is then allowed to cool to room temperature, and the contents transferred to a larger flask under ambient environment. Ethanol (200 mL) is added to precipitate a black product. The black product is then dispersed in 200 mL hexane, and then precipitated out by adding 200 mL ethanol. The resulting solid has a Pt:V:Fe ratio of 37:30:33.

Example 9

A three-neck 500 mL flask is charged with 240 mL octyl ether, 4.0 g HDD, 0.80 g Pt(acac)$_2$, 0.37 g Ni(acac)$_2$, 0.80 g Fe(acac)$_2$, 4 mL OAM, and 1.2 mL OAC, and the mixture is under constant stirring. The mixture is placed under a nitrogen atmosphere and heated to 105° C. to remove residual water. The mixture is then heated to reflux for 30 minutes at 230° C.

The mixture is then allowed to cool to room temperature, and the contents transferred to a larger flask under ambient environment. Ethanol (400 mL) is added to precipitate a black product. The black product is then dispersed in 100 mL hexane, and then precipitated out by adding 400 mL ethanol. The resulting solid has a Pt:Ni:Fe ratio of 30:29:41.

Example 10

A three-neck 250 mL flask is charged with 50 mL octyl ether, 0.25 g HDD, 0.20 g Pt(acac)$_2$, and 0.133 g Ni(acac)$_2$. The mixture is placed under a nitrogen atmosphere and heated to 105° C. to remove residual water. To this mixture is added 1.0 mL OAM, 0.3 mL OAC and 0.11 mL Fe(CO)$_5$, the mixture is then heated to reflux for 20 minutes at 230° C.

The mixture is then allowed to cool to room temperature, and the contents transferred to a larger flask under ambient environment. Ethanol (100 mL) is added to precipitate a black product. The black product is then dispersed in 50 mL hexane in the presence of 0.1 mL OAM and 0.1 mL OAC, and then precipitated out by adding 100 mL ethanol, and centrifuging. The resulting solid has a Pt:Ni:Fe ratio of 25:36:39.

Example 11

A three-neck 250 mL flask is charged with 70 mL octyl ether and 200 g carbon black (Ketjen Black ECP), and the mixture is sonicated for four hours. Then, 0.25 g HDD, 0.20 g Pt(acac)$_2$, and 0.075 g VO(acac)$_2$, are added, and the mixture is constantly stirred. The mixture is placed under a nitrogen atmosphere and heated to 105° C. to remove residual water. To this mixture is added 0.15 mL Fe(CO)$_5$, and then the mixture is heated to reflux for 40 minutes at 270° C.

The mixture is then allowed to cool to room temperature, and the contents transferred to a larger flask under ambient environment. The product was precipitated. The black precipitate was then dispersed in 200 mL hexane, and precipitated out overnight three times. The resulting solid has a Pt:V:Fe ratio of 33:16:51.

Example 12

The product from Example 5 above was heated under nitrogen to 400° C. for 40 minutes. The organic shell components were then removed by heating to 300° C. under a 15/85 oxygen/nitrogen mixture for 90 minutes. The seven different samples of the solid were then each calcined at a different temperature ranging from 350° C. to 650° C. under a flow of 15/85 hydrogen/nitrogen for two hours. The solids were then cooled to room temperature.

Figure 4:
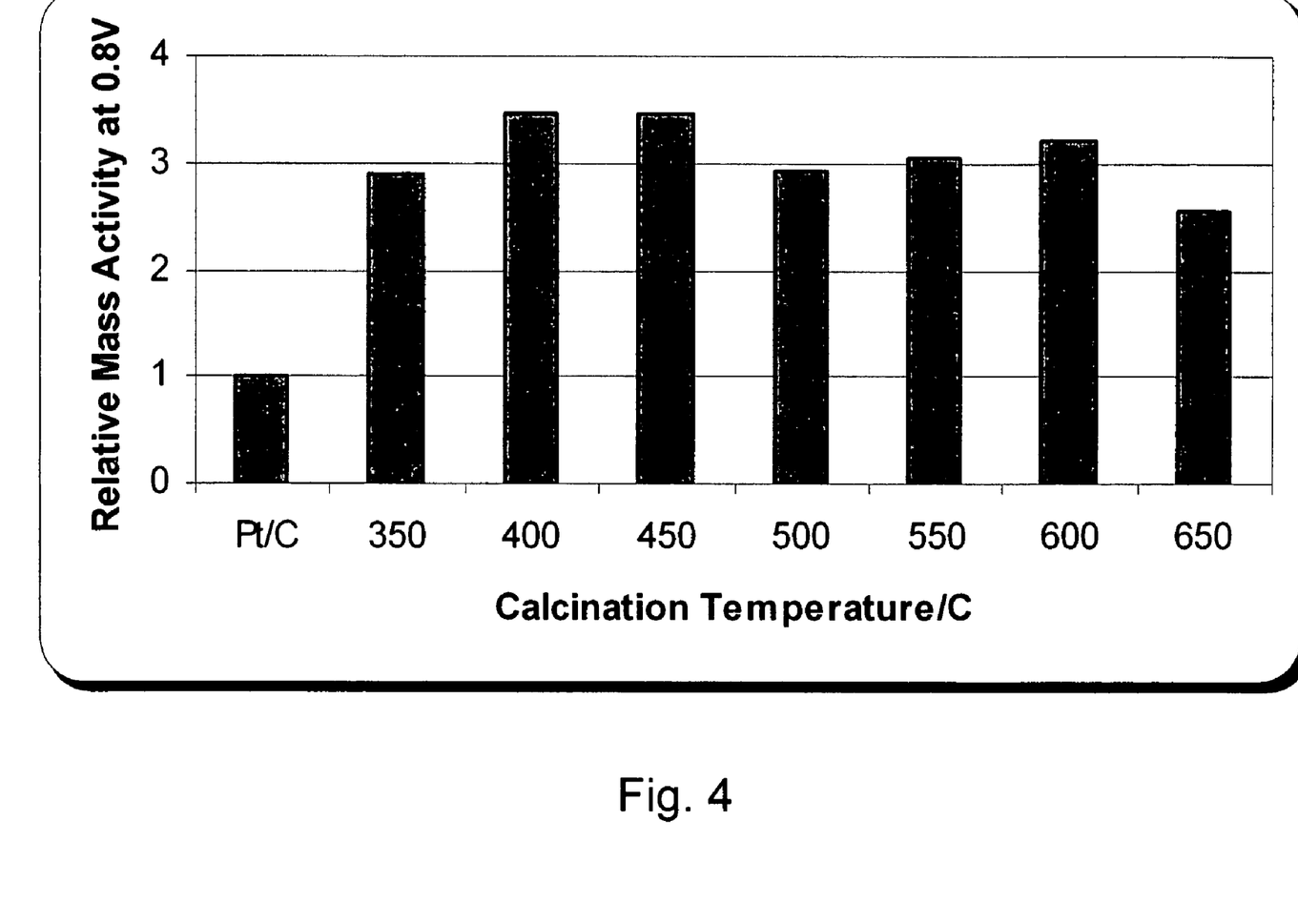
FIG. 4 is a bar graph of the relative mass-based activities at 0.8 V for platinum, vanadium, and iron-containing nanoparticles made according to the present teachings at various calcination temperatures.

The seven samples were than tested on the hydrodynamic RDE and the relative mass-based activity for each of the seven samples as compared to a Pt/C standard are illustrated in FIG. 4.

Example 13

The respective products from Examples 9 and 10 above were heated under nitrogen to 400° C. for two hours. The organic shell components were then removed by heating to 280° C. to 300° C. under a 15/85 oxygen/nitrogen mixture for 60 minutes. The samples were then pre-reduced by heating in nitrogen for two hours at 300° C. The two samples were then calcined at 400° C. for 4 hours and 500° C. for 2 hours, respectively, under a flow of 15/85 hydrogen/nitrogen. The solids were then cooled to room temperature.

Figure 5:
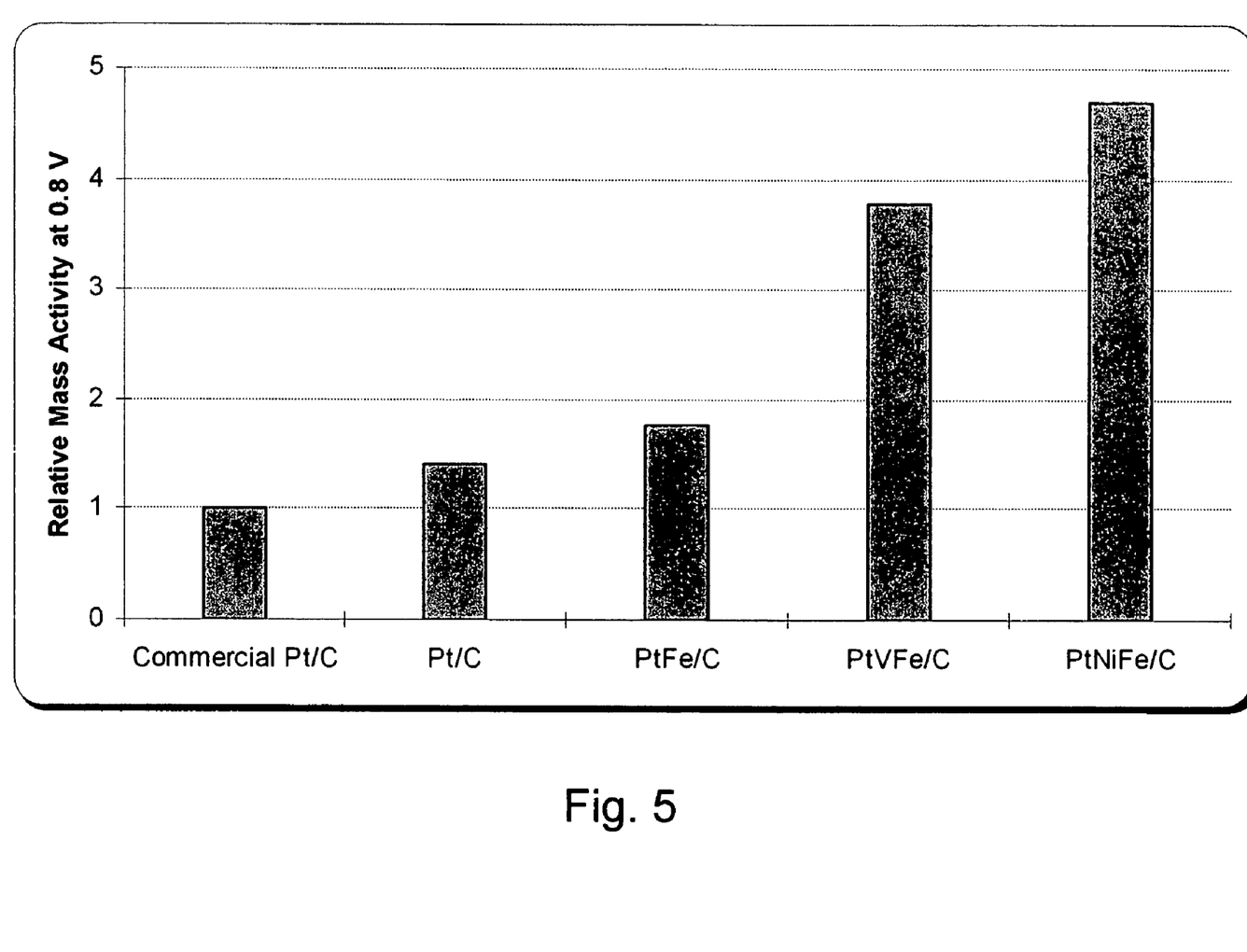
FIG. 5 is a bar graph of the relative mass-based activities of various carbon supported nanoparticles made according to the present teachings in comparison with a commercially available Pt/C catalyst.

The electrochemical activities for oxygen reduction reaction of various catalysts described above are shown in FIG. 5, in comparison with a commercially available Pt/C catalyst.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of preparing alloy nanoparticles comprising:
   contacting at least one first metal-containing component with a reducing agent to form a first reaction mixture;
   heating the first reaction mixture to a first temperature;
   incorporating at least one second metal-containing component different from the first metal-containing component and at least one capping agent into the first reaction mixture at the first temperature to form a second reaction mixture;
   heating the second reaction mixture to a second temperature;
   cooling the second reaction mixture; and
   precipitating alloy nanoparticles from the cooled second reaction mixture.

2. The method according to claim 1, wherein the second reaction mixture is heated to reflux conditions.

3. The method according to claim 1, further comprising:
   contacting the alloy nanoparticles with a support material to form a supported alloy nanoparticles.

4. The method according to claim 3, wherein the support material comprises at least one member selected from the group consisting of carbon, carbon black, carbon fiber, carbon nanotube, inorganic materials, and combinations thereof.

5. The method according to claim 1, wherein a support material is incorporated with the solvent system prior to the contacting step.

6. The method according to claim 1, further comprising one or more of the following:
   heating the alloy nanoparticles to a sufficient temperature to remove solvent and form solvent-free alloy nanoparticles;
   heating the solvent-free alloy nanoparticles to a sufficient temperature in a sufficiently oxidizing environment to oxidize any capping agents and form decapped alloy nanoparticles; and
   heating the decapped alloy nanoparticles to a sufficient temperature in a sufficiently reducing environment to reduce the metals of the decapped alloy nanoparticles.

7. The method according to claim 1, wherein each of the first and the second metal-containing components comprises a metal-containing complex having one or more non-metallic moieties selected from the group consisting of hydroxyls, amines, carbonyls, nitrates, oxides, acetylacetonates, halides, chlorides, alkyl-containing moieties, alkoxy-containing moieties, aryl-containing moieties, nitrosyl-containing moieties, and combinations thereof.

8. The method according to claim 1, wherein each of the first and the second metal-containing components comprises a metal-containing complex containing at least one metal selected from the group consisting of titanium, zirconium, vanadium, tantalum, chromium, molybdenum, tungsten, manganese, rhenium, iron, ruthenium, osmium, cobalt, rhodium, iridium, nickel, palladium, platinum, copper, tin, and selenium.

9. The method according to claim 1, wherein the contacting step occurs in a solvent system comprising a high-temperature solvent system that decomposes at a temperature greater than about 300° C.

10. The method according to claim 9, wherein the high-temperature solvent system comprises one or more component selected from the group consisting of octyl ether, benzyl ether, toluene, tetrahydrofuran, hexane, propanol, water, 1-butanol, diphenylmethane, phenyl ether, ethanol, ethylenediamine, and combinations thereof.

11. The method according to claim 1, wherein the reducing agent comprises one or more reducing agent selected from the group consisting of sodium borohydride, 1,2-hexadecanediol, trimethylaluminum, formic acid, ammonium hydroxide, hydrazine monohydrate, and combinations thereof.

12. The method according to claim 1, wherein contacting at least one first metal-containing component with a reducing agent further comprises reducing by a reducing process selected from the group consisting of sonolysis, boil liquid reduction, reverse micelle, and combinations thereof.

13. The method according to claim 1, wherein the capping agent comprises one or more component selected from the group consisting of a thiol, a polyacrylic acid, oleyl amine, oleic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

14. A method of preparing alloy nanoparticles comprising:
   contacting at least a first metal-containing component and a second metal-containing component with a reducing agent in a solvent system to form a first reaction mixture;
   heating the first reaction mixture to a first temperature;
   incorporating at least a third metal-containing component and at least one capping agent to the first reaction mixture at the first temperature to form a second reaction mixture;
   heating the second reaction mixture to a second temperature;
   cooling the reaction mixture; and
   precipitating alloy nanoparticles from the cooled reaction mixture.

15. The method according to claim 14, wherein the second reaction mixture is heated to reflux conditions.

16. The method according to claim 14, further comprising:
   contacting the alloy nanoparticles with a support material to form a supported alloy nanoparticles.

17. The method according to claim 16, wherein the support material comprises at least one member selected from the group consisting of carbon, carbon black, carbon fiber, carbon nanotube, inorganic materials, and combinations thereof.

18. The method according to claim 14, wherein a support material is incorporated with the solvent system prior to the contacting step.

19. The method according to claim 14, further comprising one or more of the following:
   heating the alloy nanoparticles to a sufficient temperature to remove solvent and form solvent-free alloy nanoparticles;
   heating the solvent-free alloy nanoparticles to a sufficient temperature in a sufficiently oxidizing environment to oxidize any capping agent and form decapped alloy nanoparticles; and
   heating the decapped alloy nanoparticles to a sufficient temperature in a sufficiently reducing environment to reduce the metals of the decapped alloy nanoparticles.

20. The method according to claim 14, wherein each of the first, the second and the third metal-containing components comprises a metal-containing complex having one or more non-metallic moieties selected from the group consisting of hydroxyls, amines, carbonyls, nitrates, oxides, acetylacetonates, halides, chlorides, alkyl-containing moieties, alkoxy-containing moieties, aryl-containing moieties, nitrosyl-containing moieties, and combinations thereof.

21. The method according to claim 14, wherein each of the first, the second and the third metal-containing components comprises a metal-containing complex containing at least one metal selected from the group consisting of titanium, zirconium, vanadium, tantalum, chromium, molybdenum, tungsten, manganese, rhenium, iron, ruthenium, osmium, cobalt, rhodium, iridium, nickel, palladium, platinum, copper, tin, and selenium.

22. The method according to claim 14, wherein the contacting occurs in a solvent system comprising a high-temperature solvent system that decomposes at a temperature greater than about 300° C.

23. The method according to claim 22, wherein the high-temperature solvent system comprises one or more component selected from the group consisting of octyl ether, benzyl ether, toluene, tetrahydrofuran, hexane, propanol, water, 1-butanol, diphenylmethane, phenyl ether, ethanol, ethylenediamine, and combinations thereof.

24. The method according to claim 14, wherein the reducing agent comprises one or more reducing agent selected from the group consisting of sodium borohydride, 1,2-hexadecanediol, trimethylaluminum, formic acid, ammonium hydroxide, hydrazine monohydrate, and combinations thereof.

25. The method according to claim 14, wherein contacting at least the first and the second metal-containing components with a reducing agent further comprises reducing by a reducing process selected from the group consisting of sonolysis, boil liquid reduction, reverse micelle, and combinations thereof.

26. The method according to claim 14, wherein the capping agent comprises one or more component selected from the group consisting of a thiol, a polyacrylic acid, oleyl amine, oleic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

* * * * *